(12) United States Patent
Singh

(10) Patent No.: US 10,131,755 B2
(45) Date of Patent: Nov. 20, 2018

(54) SYSTEM AND METHOD FOR FORMATION OF THIN FILMS WITH SELF-ASSEMBLED MONOLAYERS EMBEDDED ON THEIR SURFACES

(71) Applicant: New Jersey Institute of Technology, Newark, NJ (US)

(72) Inventor: Pushpendra Singh, Pine Brook, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 439 days.

(21) Appl. No.: 14/212,761

(22) Filed: Mar. 14, 2014

(65) Prior Publication Data

US 2014/0302312 A1  Oct. 9, 2014

Related U.S. Application Data

(60) Provisional application No. 61/781,692, filed on Mar. 14, 2013.

(51) Int. Cl.
*B29C 70/62* (2006.01)
*C08J 7/06* (2006.01)
*B03C 5/00* (2006.01)

(52) U.S. Cl.
CPC .......... *C08J 7/06* (2013.01); *B29C 70/62* (2013.01); *Y10T 428/249921* (2015.04); *Y10T 428/268* (2015.01)

(58) Field of Classification Search
CPC .................................................. B03C 5/005
USPC .............. 264/438, 439, 440, 484; 250/432 R
See application file for complete search history.

(56) References Cited

U.S. PATENT DOCUMENTS

| | | | | |
|---|---|---|---|---|
| 3,519,583 A | * | 7/1970 | Huggard | C09D 5/4484 204/493 |
| 3,626,041 A | * | 12/1971 | Fields | B29C 70/10 162/192 |
| 4,419,200 A | * | 12/1983 | Hsu | B01D 17/06 204/563 |
| 7,943,677 B2 | * | 5/2011 | Papangelou | A61L 27/18 264/49 |
| 8,030,376 B2 | * | 10/2011 | Kurz | C08J 3/2053 523/333 |
| 8,049,183 B1 | * | 11/2011 | Aubry | B82Y 30/00 250/428 |

(Continued)

OTHER PUBLICATIONS

Aubry et al., Micro- and nanoparticles self-assembly for virtually defect-free, adjustable monolayers, PNAS vol. 15, No. 10, 3711-3714, 2008.*

(Continued)

*Primary Examiner* — Atul P. Khare
(74) *Attorney, Agent, or Firm* — McCarter & English, LLP

(57) ABSTRACT

The present invention relates to a method for the formation of virtually defect-free monolayers of particles with long-range order. The technique involves assembling the monolayer of particles on the interface between a solidifiable liquid and a fluid, which can be air or another liquid, ordering the particles using an electric field and then solidifying the former, e.g., by applying UV light. The monolayer becomes embedded on the surface of the solidified film. The monolayers can be coated onto the surface of materials to optimize their mechanical, thermal, electrical and optical properties.

20 Claims, 6 Drawing Sheets

(56) References Cited

U.S. PATENT DOCUMENTS

| | | | | |
|---|---|---|---|---|
| 8,357,279 B2* | 1/2013 | Aubry | ............... | B03C 5/026 204/547 |
| 8,729,460 B2* | 5/2014 | Aubry | ............... | B82Y 30/00 204/600 |
| 8,753,497 B2* | 6/2014 | Aubry | ............... | B03C 5/005 204/450 |
| 2004/0262790 A1* | 12/2004 | Fu | ............... | B82Y 20/00 264/1.21 |
| 2009/0174117 A1* | 7/2009 | Winkler | ............... | C04B 38/045 264/319 |
| 2010/0215961 A1* | 8/2010 | Aubry | ............... | B03C 5/026 428/403 |
| 2013/0112613 A1* | 5/2013 | Kang | ............... | B29C 67/202 210/500.21 |

OTHER PUBLICATIONS

Aubry et al., Physics underlying controlled self-assembly of micro- and nanoparticles at a two-fluid interface using an electric field, Physical Review 77, 056302 (1-11), 2008.*

Nicolson, M.M., The interaction between floating particles, *Proc. Cambridge Philos. Soc.*, 45, pp. 288-295, 1949.

Cox, P. A. Hydrophilous pollination. Ann. Rev. Ecol, Syst., 19, pp. 261-280, 1989.

Cox, P. A., et al. Two-dimensional pollination in hydrophilous plants: Convergent evolution in the genera *Halodule* (Cymodoceaceae), *Halophila* (Hydrocharitaceae), *Ruppia* (Ruppiaceae), and *Lepilaena* (Zannichelliaceae). Amer. J. Bot. 76(2): pp. 164-175, 1989.

Kralchevsky, P.A., et al., Capillary Meniscus Interaction between Colloidal Particles Attached to a Liquid-Fluid Interface, J. Colloid and Interface Sci., vol. 151, No. 1, pp. 79-94, Jun. 1992.

Lucassen, J., Capillary forces between solid particles in fluid interfaces, Colloids and Surfaces, 65, pp. 131-137, 1992.

Blanco, A., et al., Large-scale synthesis of a silicon photonic crystal with a complete three-dimensional bandgap near 1.5 micrometres, Nature, vol. 405, pp. 437-440, 2000.

Stamou, D., et al., Long-range attraction between colloidal spheres at the air-water interface: The consequence of an irregular meniscus, Phys. Rev. E, vol. 62(4), pp. 5263-5272, 2000.

Gust, D., et al., Mimicking Photosynthetic Solar Energy Transduction, Acc. Chem. Res., 34, pp. 40-48, 2001.

Binks, B.P., Current Opinion in Colloid and Interface Science, 2002, 7, 21-41.

Nikolaides, M.G., et al., Electric-field-induced capillary attraction between like-changed particles at liquid interfaces, Nature vol. 420, pp. 299-301, 2002.

Jiang, P. et al., Wafer-Scale Periodic Nanohole Arrays Templated from Two-Dimensional Nonclose-Packed Colloidal Crystals, J. Am. Chem. Soc., vol. 127, pp. 3710-3711, 2005.

Singh, P., et al., Fluid dynamics of floating particles, *J. Fluid Mech.*, vol. 530, pp. 31-80, 2005.

Tang, Z., et al., Self-Assembly of CdTe Nanocrystals into Free-Floating Sheets, Science, vol. 314, pp. 274-278, 2006.

Bresme, F., et al., Nanoparticles at fluid interfaces, J. Phys. Condens. Matter 19, 413101, pp. 1-33, 2007.

Aubry, N., et al., Micro- and nanoparticles self-assembly for virtually detect-free, adjustable monolayers, Proc. Natl. Acad. Sci. U.S.A. vol. 105(10), pp. 3711-3714, 2008.

Aubry, N., et al., Physics underlying controlled self-assembly of micro- and nanoparticles at a two-fluid interface using an electric field, Phys. Rev. E 77, 056302, pp. 1-11, 2008.

Janjua, M., et al., Electric field induced alignment and self-assembly of rods on fluid-fluid interfaces, Mech. Res. Comm., 36, pp. 55-64, 2009.

Singh, P., et al., Dispersion and attraction of particles floating on fluid-liquid surfaces, *Soft Matter*, 6, pp. 4310-4325, 2010.

Janjua, M., et al., Electric field-induced self-assembly of micro- and nanoparticles of various shapes at two-fluid interfaces, Electrophoresis, 32, pp. 518-526, 2011.

U.S. Appl. No. 61/781,692, filed Mar. 14, 2015.

* cited by examiner (a)

(b)

(c)

SYSTEM AND METHOD FOR FORMATION OF THIN FILMS WITH SELF-ASSEMBLED MONOLAYERS EMBEDDED ON THEIR SURFACES

This application claims the benefit of U.S. Provisional Patent Application Ser. No. 61/602,403 filed Mar. 14, 2013.

STATEMENT REGARDING FEDERALLY SPONSORED RESEARCH

This invention was made with government support under award and/or contract CBET-1067004 awarded by the National Science Foundation (NSF). Therefore, the government has certain rights in the invention.

FIELD OF THE INVENTION

The present invention relates to thin films and self-assembled monolayers.

BACKGROUND OF THE INVENTION

The use of micro-fabrication methods that self-assemble materials from individual particles, as in many naturally occurring processes, has grown over the past decade because of their ability to create intricate microstructures. One such method for forming monolayers of particles is the capillarity based self-assembly. In recent years, many studies have been conducted to understand this process because of the importance of monolayers in a range of technological applications, e.g., for forming novel micron and nano structured materials and for stabilizing emulsions, and also because the behavior of particles trapped on fluid interfaces is important for understanding a range of physical processes, e.g., the formation of pollen rafts which play an important role in hydrophilous pollination and the clustering of insect eggs.

A common example of capillarity-driven self-assembly is the clustering of breakfast-cereal flakes floating on the surface of milk. The deformation of the interface by the flakes gives rise to lateral capillary forces which cause them to cluster. This technique has been widely used for two-dimensional assembly of particles at liquid surfaces. It, however, produces monolayers which lack long range order and have defects, and the distance between the particles cannot be controlled as they touch each other. Furthermore, the technique cannot be used when lateral capillary forces arising because of the buoyant weight of particles, which vary as the sixed power of the radius, become smaller than Brownian forces. For particles floating on an air-water interface this limit is reached when the particle size is smaller than ~10 µm. Particles smaller than this limiting size move randomly and do not cluster.

SUMMARY OF THE INVENTION

The present invention relates to the showing that the capillarity based process for self-assembling particle monolayers on fluid-liquid interfaces can be improved by applying an electric field in the direction normal to the interface. The electric field gives rise to repulsive dipole-dipole forces among the particles causing them to move apart and thus move freely without blocking one another. The latter allows for the formation of virtually defect-free monolayers with long-range order. The present invention, in part, utilizes a technique for freezing these expanded monolayers onto the surface of a thin flexible film. The technique involves assembling the monolayer on the interface between a solidifiable fluid, for example, a UV curable resin, and a second fluid, which can be air or another liquid, and then solidifying the first fluid, for example, by curing the UV curable resin by applying UV light. The monolayer becomes embedded on the surface of the solidified resin film. Micron and sub-micron particles, which in powdered form are normally agglomerated, are used as a suspension of deagglomerated particles in the formation of the monolayers of the invention.

BRIEF DESCRIPTION OF THE DRAWINGS

So that those having ordinary skill in the art will have a better understanding of how to make and use the disclosed monolayers and methods, reference is made to the accompanying figures wherein.

DETAILED DESCRIPTION OF THE INVENTION

This invention relates to a process of obtaining a monolayer of particles fixed on the surface of a substrate, where the particles are essentially evenly spaced, and to the films that are produced by the process. The method comprises placing non-soluble particles in the interface between the upper and lower layers of two immiscible fluids, applying an electric field to evenly distribute the particles, fixing the particles to one of the fluids, and removing the other fluid. The fluids are chosen so that the density of the upper fluid is smaller than the density of the particles and the density of the lower fluid is greater than that of the particles so that the particles in the upper fluid sediment to the interface and the particles in the lower fluid rise to the interface where they are trapped or adsorbed. The particles remained trapped in the interface because of the vertical component of interfacial tension. The UV curable (or any other solidifiable fluid) can be the upper or the lower fluid.

In the case where the particles are normally agglomerated, the particles can be suspended in the fluid of one of the layers and the agglomeration broken by means known in the art, such as an ultrasound and/or magnetic mixer. Once the deagglomerated particles have been adsorbed in the fluid-fluid interface, the monolayer of particles is manipulated by application of an electric field to obtain the desired spacing. The solidifiable fluid layer is then solidified.

Non-limiting examples of particles which can be used in the invention include glass, silica, polystyrene, steel and salt crystals. Non-limiting examples of fluid-fluid interfaces include curable resin/air, curable resin/corn oil and curable resin/silicone oil.

This invention relates to a novel technique for coating the surface of a material with a monolayer (single layer) of particles to optimize its mechanical, thermal, electrical, and optical properties. The technique involves the self-assembly of a particle monolayer on a fluid-liquid interface to obtain a defect-free lattice structure with desired lattice spacing, and then transferring the monolayer to a solid substrate. The method involves applying an electric field normal to the interface which leads to the generation of an electric force normal to the interface and a dipole-dipole repulsive force amongst particles. The repulsive force, together with the buoyant weight and the electrostatic-force induced capillary forces, leads to the formation of defect-free monolayers with adjustable spacing. The monolayer is then frozen onto the surface of a thin flexible film which can then be coated onto a material to control the mechanical, thermal, electrical, and optical properties of the surface.

Figure 1:
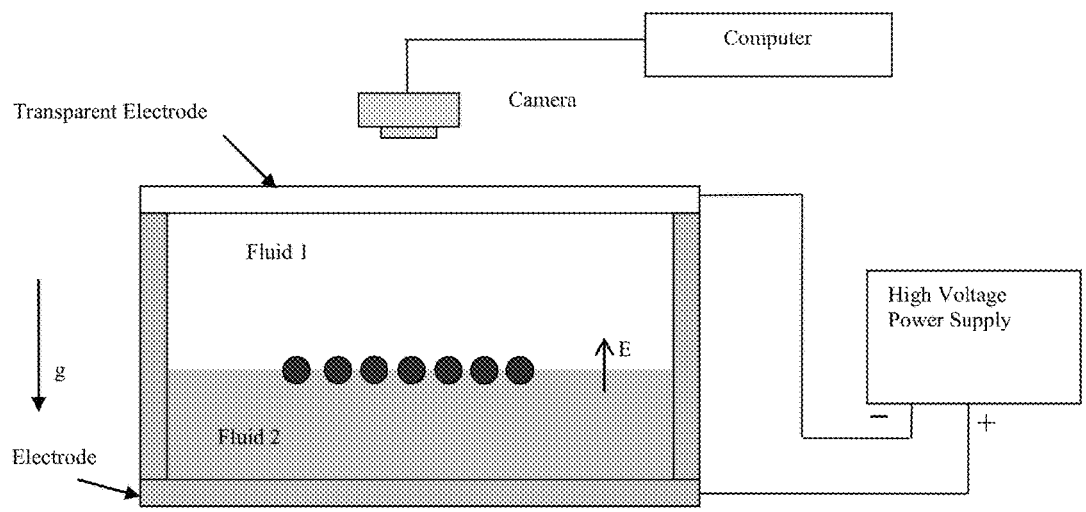
FIG. 1 shows a schematic diagram of the process of the invention.

Thus, the deficiencies of the capillarity-driven clustering process are overcome by applying an external electric field normal to the interface causing particles trapped at the interface to experience dipole-dipole electrostatic repulsion, as well as an electrostatic force normal to the interface. The latter is a new phenomenon in which the electrostatic force arises because of the jump in the dielectric properties across the interface. This force varies as $R^2$, where R is the particle radius, and is therefore stronger for small particles than the buoyant weight and the dielectrophoretic force as both of these forces vary as $R^3$. The resulting self-assembly process is capable of controlling the lattice spacing statically or dynamically, forming virtually defect-free monolayers, and manipulating a broad range of particle sizes and types (FIG. 1). In general, the electric field due to the upper and lower electrodes is approximately uniform and in the direction normal to the fluid-fluid interface in the middle where monolayers are assembled. After a suitable defect-free monolayer with desired lattice-spacing is formed, it is frozen onto the surface of a thin flexible film. The technique involves assembling the monolayer on the interface between a UV curable resin and a fluid, which can be air or another liquid, and then curing the former by applying UV light. The monolayer becomes embedded on the surface of the solidified resin film. The assembled monolayer is frozen almost instantaneously without any change to its microstructure as the resin solidifies in less than one second.

Since the curing time for the resin is less than one second, the electric field could be switched off without any significant change to its microstructure, as particles in the size range of from about 100 nm to about 100 μm does not move significantly during such small time intervals. Therefore, for embodiments using particles in the size range it is possible to switch off the field during the curing process. The approach can also be used as a low-cost alternative to the pattern forming methods such as those based on electron-beam lithography and other micro-fabrication techniques.

It has been shown that it is possible to control the process of self-assembly, including the lattice spacing, by applying an ac or dc electric field in the direction normal to the interface (see FIG. 1). This results in an electric force which acts on the particles in the direction normal to the interface as well as on the repulsive electric forces among the particles. The point dipole approximation often used in computations for obtaining the force cannot be used in this case. Instead, one needs to carry out direct numerical simulations based on the Maxwell stress tensor in order to account for the modification of the electric field by the particle and the fluid-liquid interface. For certain embodiments of the present invention, the direct numerical simulation data was used to obtain the following expression for the vertical electric force $$F_{ev} = R^2 \varepsilon_0 \varepsilon_a \left(\frac{\varepsilon_L}{\varepsilon_a} - 1\right) E^2 f_v \left(\frac{\varepsilon_L}{\varepsilon_a}, \frac{\varepsilon_p}{\varepsilon_a}, \theta_c, \frac{h_2}{R}\right) \quad (1)$$

where E is the electric field strength or the rms value for an ac electric field, $\varepsilon_p$, $\varepsilon_a$ and $\varepsilon_L$ are the dielectric constants of the particles, the upper fluid and the lower fluid, respectively, $\varepsilon_0$ is the permittivity of free space, R is the particle radius, and $$f_v\left(\frac{\varepsilon_L}{\varepsilon_a}, \frac{\varepsilon_p}{\varepsilon_a}, \theta_c, \frac{h_2}{R}\right)$$

is an O(1) dimensionless function of the included arguments.

Figure 2:
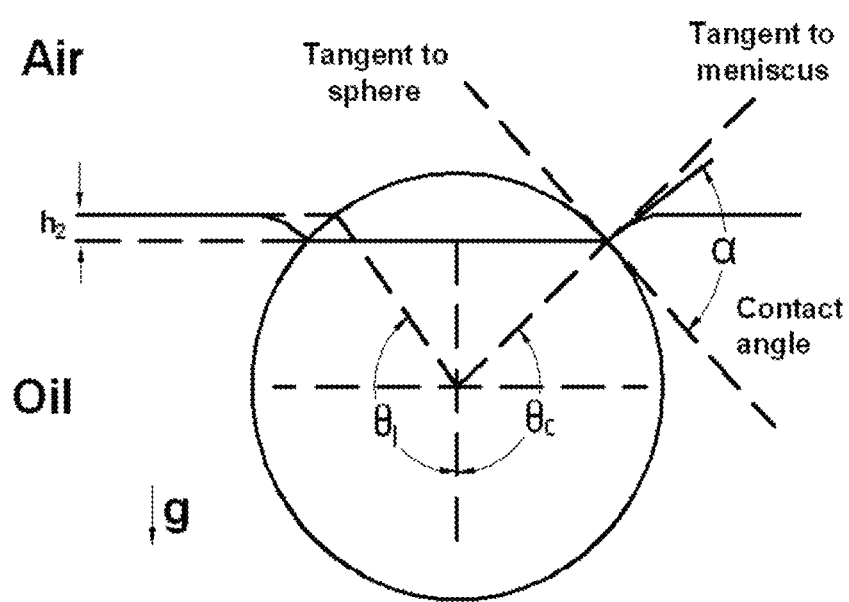
FIG. 2 shows a schematic of a heavier-than-liquid hydrophilic sphere.

The force depends on the dielectric constants of the two fluids involved and the position ($\theta_c$) of the particle within the interface. FIG. 2 shows a schematic of a heavier-than-liquid hydrophilic (wetting) sphere of radius R hanging on the contact line at $\theta_c$. The point of extension of the flat meniscus on the sphere determines the angle $\theta_1$ and height $h_2$ is determined by the force balance. The above estimate utilizes, in certain embodiments of the present invention, that both particles and fluids are perfect dielectrics and that the interface is flat. The above analysis is valid for weakly conducting fluids for which an ac electric field is applied.

The electric force varies as $R^2$, and it may act against or in the same direction as the buoyant weight depending on these parameter values. As the particle radius decreases, the buoyant weight, which scales as $R^3$, becomes negligible in the sense that the vertical capillary force, which scales as R, needed to balance the buoyant weight is obtained by a negligibly small interfacial deformation. However, even a negligibly-small deformation of the interface gives rise to attractive lateral capillary forces which, even though small, cause particles to cluster. This happens because a particle floating on a liquid surface is free to move laterally. The only resistance to its lateral motion is the hydrodynamic drag which can slow its motion but cannot stop it. Consequently, only very-small particles, for which lateral capillary forces are smaller than Brownian forces, do not cluster. For example, on an air-water interface, lateral capillary forces become smaller than Brownian forces when R<~10 μm, and so particles smaller than this limiting size undergo Brownian motion on the interface and do not cluster.

The vertical electric force gives rise to lateral capillary forces which remain significant even for nano particles.

This can be seen from the expression for the lateral capillary force $F_{lc}$ between two particles which depends on the net vertical force acting on the particles that includes its buoyant weight and the vertical electrostatic force.

$$F_{lc} = -\left(-\varepsilon_0 \varepsilon_a \left(\frac{\varepsilon_L}{\varepsilon_a} - 1\right) R^2 E^2 f_v + \frac{4}{3}\pi R^3 \rho_p g f_b\left(\frac{\rho_a}{\rho_L}, \frac{\rho_p}{\rho_L}, \theta_c, \frac{h_2}{R}\right)\right)^2 \frac{1}{2\pi\gamma r}. \quad (2)$$

Here r represents the distance between the particles, g is the acceleration due to gravity, $\rho_p$ is the particle density, $\gamma$ is the surface tension, and $$f_b\left(\frac{\rho_a}{\rho_L}, \frac{\rho_p}{\rho_L}, \theta_c, \frac{h_2}{R}\right)$$

is the dimensionless buoyant weight of particle, where $\rho_\alpha$ and $\rho_L$ are the densities of the upper and lower fluids. The negative sign indicates that the force is attractive. The above assumes that the particles are of the same type and size, and that the distance between them is much larger than their radius. The force varies as the fourth power of the applied electric field, and if the vertical electric force and the buoyant weight are in the same direction, the electric field enhances the lateral capillary force between the particles. In a sufficiently-strong electric field, i.e., E~O ($10^6$ V/m), lateral capillary forces are stronger than Brownian forces even for nanoparticles. Thus, the technique can be used to self-assemble nanoparticles.

It is noteworthy, as well as utilized in certain embodiments of the present invention, that even a negligibly-small deformation of the interface due to the buoyant weight of floating particles gives rise to attractive lateral capillary forces which, even though small, cause particles to cluster. This happens because a particle floating on a liquid surface is free to move laterally. The only resistance to its lateral motion is the hydrodynamic drag which can slow its motion but cannot stop it. Consequently, only very-small particles, for which lateral capillary forces are smaller than Brownian forces, do not cluster. For example, on an air-water interface, lateral capillary forces become smaller than Brownian forces when R<~10 μm, and so particles smaller than this limiting size undergo Brownian motion on the interface and do not cluster.

In the presence of an externally applied electric field normal to the interface the two particles also experience a repulsive electrostatic force which can be written as $$F_D(r) = \varepsilon_0 \varepsilon_a \left(\frac{\varepsilon_L}{\varepsilon_a} + 1\right) R^2 E^2 \left(\frac{R}{r}\right)^4 f_D\left(\frac{\varepsilon_L}{\varepsilon_a}, \frac{\varepsilon_p}{\varepsilon_a}, \theta_c, \frac{h_2}{R}\right) \quad (4)$$

where $f_D$ is a dimensionless function of the included arguments, with the force depending upon the sixth power of the particle radius R and on the fourth power of the inverse of the distance between the particles. The above expression was obtained by assuming that the interface is flat. The force depends on the dielectric constants of the two fluids involved, and the positions $\theta_c$ of the particles within the interface. The latter was assumed to be the same for the two particles. However, if particles are not of the same type or size, their positions $\theta_c$ within the interface would be different, and the interaction force is even more complex.

In the absence of an externally applied electric field and in the case where the only forces acting on the particles are lateral capillary forces which are assumed to be stronger than Brownian forces, particles cluster together so that they touch each other. However, when the electric field is present the dimensionless equilibrium separation $r_{eq}/(2R)$ between two (isolated) particles can be obtained by equating the repulsive electrostatic force (4) and the attractive capillary force (2). After simplification, we obtain $$\frac{r_{eq}}{2R} = \frac{1}{2}\left(\frac{2\pi\varepsilon_0\varepsilon_a\left(\frac{\varepsilon_L}{\varepsilon_a}+1\right)\gamma E^2 f_D}{R\left(-\varepsilon_0\varepsilon_a\left(\frac{\varepsilon_L}{\varepsilon_a}-1\right)E^2 f_v + \frac{4}{3}\pi R\rho_p g f_b\right)^2}\right)^{\frac{1}{3}}. \quad (5)$$

This expression gives the dependence of $r_{eq}/(2R)$ on the parameters of the problem. The lattice spacing for micron sized particles increases with increasing electric field intensity which was found to be in good agreement with experimental data. An increased spacing allows the particles to move freely without blocking one another which makes the formation of virtually defect free monolayers with long range order possible and is employed in certain exemplary embodiments. Furthermore, as the electric force remains significant even for nano sized particles, the technique is also suitable for manipulating their monolayers and is therefore utilized in further embodiments of the present invention. It thus overcomes all of the shortcomings of the capillarity induced clustering process mentioned above.

However, once the electric field is switched off, the increased lattice spacing and the defect-free structure of the monolayer cannot be maintained because of the presence of capillary and Brownian forces. As noted above, capillary forces cause particles to cluster and Brownian forces (which are important for small particles) cause them to move randomly. In one embodiment of the present invention the problem of freezing an assembled monolayer so that it can be transferred onto a solid substrate without any distortion is addressed to alleviate this issue.

The monolayers of particles with variable inter-particle spacing assembled in a fluid-liquid interface by applying an electric field in the direction normal to the interface, or by another approach, can be frozen so that they can be transferred to a solid substrate. The technique requires one of the fluids to be solidifiable, which in one embodiment is UV curable resin, however further embodiments of the present invention are not limited to such. The assembled monolayers can be frozen almost instantaneously without any change to their microstructures as the resin solidifies in less than one second for one embodiment of the present invention. These monolayer embedded films can be used in a range of applications. The approach can also be used as a low cost alternative to the pattern forming methods such as those based on electron beam inching and other micro fabrication techniques.

The presence of a second liquid is however not necessary. The upper fluid can be air. FIG. 3a shows a monolayer of 8 μm particles self-assembled on the surface of the UV-curable resin by a similar procedure. That is, an electric field in the direction normal to the surface was applied to first increase the spacing among the particles, and then after all defects were removed the resin was cured by applying UV light. The application of the electric field was in fact needed to form the monolayer since for 8 μm sized particles lateral capillary forces arising because of their buoyant weight alone were negligible. Also, some of the particles of the monolayer remained agglomerated which modified the local microstructure as the agglomerates containing two or more particles repelled their neighbors more strongly, and so the inter-particle spacing around agglomerated particles was larger.

For micron and sub-micron sized particles which in powered form are normally agglomerated this was a severe problem because agglomerates did not break even when a strong electric field was applied. To overcome this problem, the agglomerated particles are first broken by treating a suspension of the particles with ultrasound and mixing. The suspension of deagglomerated particles is then used as the upper liquid layer and the UV-curable resin as the lower layer.

Cases in which the density of the liquid used for deagglomerating particles was smaller than the resin density and the case in which the resin itself was used to deagglomerate particles were also considered. In the former case, the density of particles was smaller than the liquid density and so the suspension was used as the lower liquid layer. In the latter case, if the density of particles was smaller than the resin density, a second liquid layer was not needed. But, if the density of particles was larger, a second liquid with the density larger than the resin density was used as a lower layer (or a second liquid with the density smaller than the resin density was used as an upper layer).

The monolayer embedded films of the invention can be coated onto the surface of materials to optimize their mechanical, thermal, electrical, and optical properties. The approach can also be used as a low-cost alternative to the pattern-forming methods such as those based on electron-beam lithography and other micro-fabrication techniques. The technique is easy to implement and can be applied to a broad range of particle sizes and types with a high level of controllability which will be useful in many applications. These include anti-reflection coatings for high-efficiency solar cells, photonic crystals, and biosensor arrays. The technique can be also used for making ultra-fine porous membranes with regular pores. To form these porous membranes, the particles must be dissolved or removed from the film to create regular pores. These membranes could be used to precisely control the mass transfer rate of a drug-delivery patch and to make nano-filters which can be used to separate proteins and other macromolecules based on their sizes.

EXPERIMENTAL

Example 1

Flexible Film with a Monolayer of Particles Embedded on its Surface

The monolayer of this particular experimental embodiment was self-assembled in the interface between a UV curable resin (RTV 800-610 UV cure, Novagard Solutions) and a Silicone oil (Dow Corning FS 1265 Fluid; with viscosity 300 cst and density 1.27 gm/cc) by applying an electric field in the direction normal to the interface. The increased spacing because of the repulsive electric forces allowed for the formation of a defect-free lattice. For the particle size range considered in this study, the distance increased with increasing electric field intensity. The increased inter-particle spacing allowed particles to move freely without blocking one another and thus allowing the formation of virtually defect-free monolayers with long-range order. The resin was then cured into a film by applying UV light. The use of a transparent upper electrode allowed us to maintain the electric field during the curing process. However, since the curing time for the resin was less than one second, the electric field could be switched off without any significant change to its microstructure, as particles in the size range of 480 nm to 100 μm considered in this study do not move significantly during such small time intervals. The monolayer in the interface between the two fluids became embedded in the surface of the solidified resin film. After the film was fully cured, any remaining Silicone oil on its surface was rinsed away.

Figure 3:
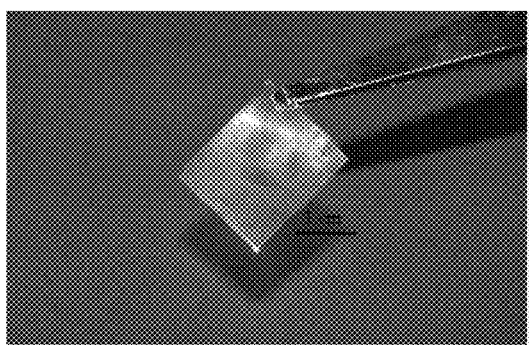
FIG. 3 shows flexible resin films with particle monolayers imbedded on their surfaces.
Figure 3:
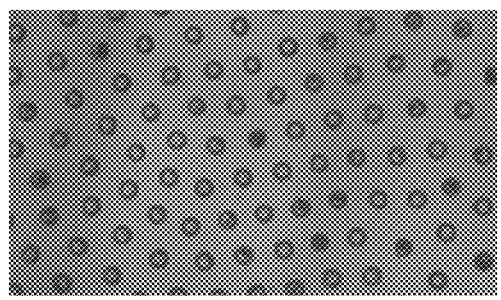
Figure 3:
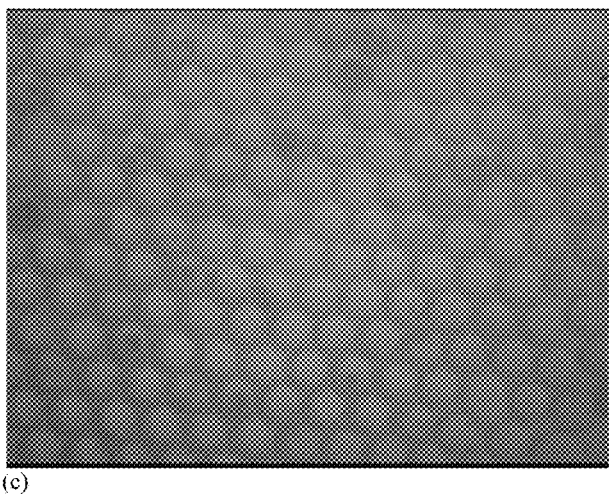

FIG. 3 shows two flexible resin films with particle monolayers imbedded on their surfaces. FIG. 3 (a) shows a resin film with an embedded monolayer of 63 μm particles. The film dimensions are 1.5×2 cm and the thickness is about 1 mm. FIG. 3 (b) shows a magnified view of the film showing the solidified monolayer of particles. The lattice spacing of the monolayer is around 5R.

Example 2

Frozen Monolayers in Which Particles Touch Each Other

The monolayers were formed by first applying an electric field in the direction normal to the interface which increased the lattice spacing and then after the defects were removed the field intensity was slowly reduced to allow the particles to come together. The intensity was decreased slowly to ensure that no new defects developed. The monolayer was then frozen into a film by applying UV light. FIG. 3 (c) shows a film with a monolayer of 45 μm particles which are touching.

Example 3

Monolayer Formed with Air as Second Layer

Figure 4:
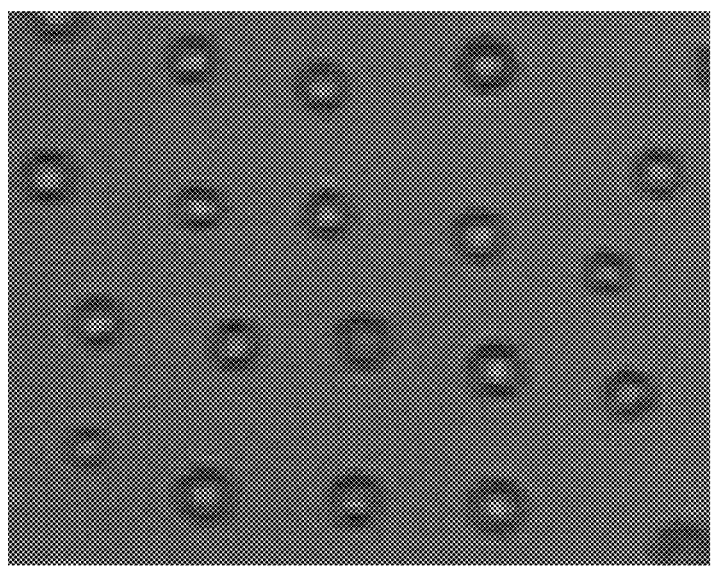
FIG. 4 shows a solidified film with an 8 µm embedded monolayer of spherical glass particles.

FIG. 4 shows a monolayer embodiment self-assembled on the surface of the UV curable resin by a similar procedure wherein air was the second layer. In this embodiment, an electric field in the direction normal to the surface was applied to first increase the spacing among the particles and then after all defects were removed the resin was cured by applying UV light. The application of the electric field was in fact needed to form the monolayer since for 8 μm sized particles lateral capillary forces arising because of their buoyant weight alone were negligible. Also, notice that some of the particles of the monolayer remained agglomerated which modified the local microstructure as the agglomerates containing two or more particles repelled their neighbors more strongly, and so the inter-particle spacing around agglomerated particles was larger.

A solidified film with an embedded monolayer of 8 μm spherical glass particles on its surface was produced. The average distance between the particles is around 8R.

Example 4

Micron and Sub-micron Particle Monolayers

Figure 5:
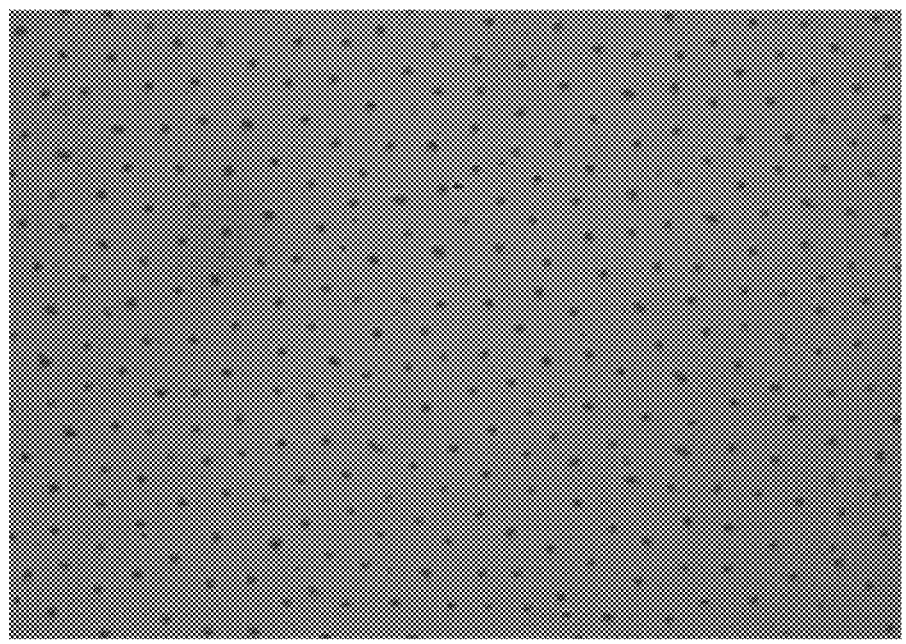
FIG. 5 shows a solidified film with an embedded 2.25 µm embedded monolayer of spherical silica particles.
Figure 6:
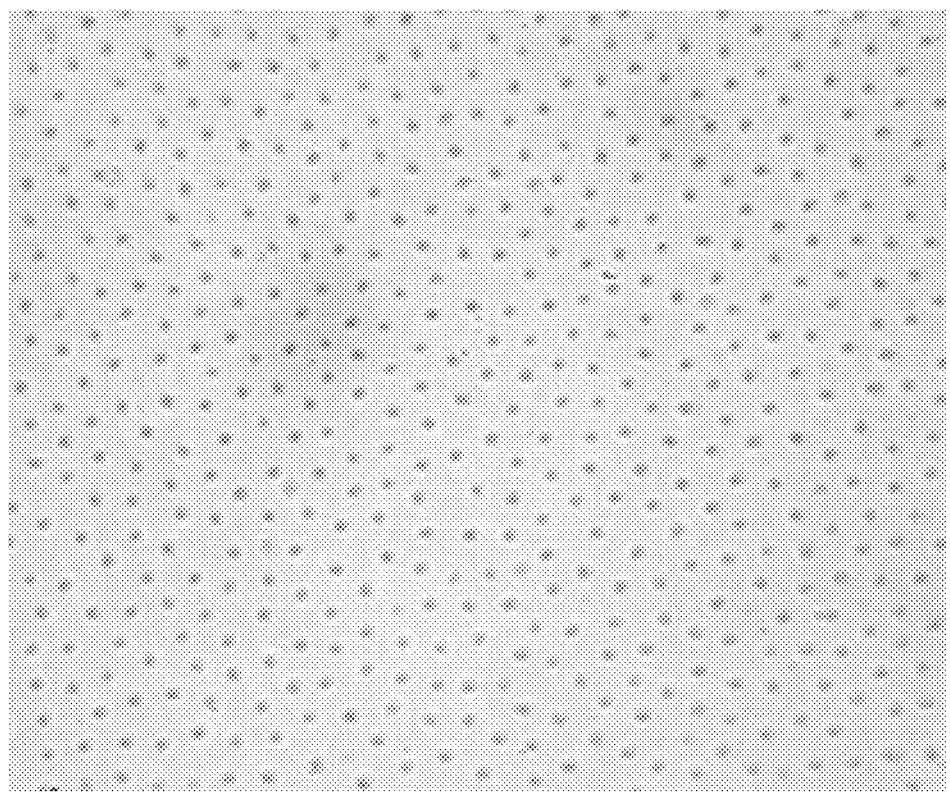
FIG. 6 shows a solidified film with a monolayer of 480 nm spherical silica particles imbedded on its surface.

Corn oil was used to form a suspension in which silica particles agglomerates were broken by using an ultrasound mixer and a magnetic mixer. The suspension consisting of deagglomerated silica particles was then used as the upper liquid layer and the UV-curable resin as the lower layer. Deagglomerated particles in the suspension settled to the corn oil-resin interface where they were captured. Then this monolayer of particles at the interface was manipulated by applying an electric field, and after the desired lattice spacing was obtained the resin was solidified by applying UV light. Corn oil was immiscible with the UV curable resin and was a good solvent in which silica particles deagglomerated. FIG. 5 shows a monolayer of 2.25 μm spherical silica particles formed on the corn oil-resin interface. The average distance between the particles was around sixteen times the diameter. FIG. 6 shows a monolayer of 480 nm spherical silica particles imbedded on its surface. The average distance between the particles is around four times the diameter.

Although the systems and methods of the present disclosure have been described with reference to exemplary embodiments thereof, the present disclosure is not limited thereby. Indeed, the exemplary embodiments are implementations of the disclosed systems and methods are provided for illustrative and non-limitative purposes. Changes, modifications, enhancements and/or refinements to the disclosed systems and methods may be made without departing from the spirit or scope of the present disclosure. Accordingly, such changes, modifications, enhancements and/or refinements are encompassed within the scope of the present invention.

I claim:

1. A process for producing a film with a monolayer of particles, the particles being arranged in long range order and being embedded on a surface of the film, the process comprising the steps of:
   placing the particles in a flat interface between a first fluid and a second fluid, the first fluid being a UV curable resin;
   applying an ac or dc electric field in a direction normal to the flat interface to cause movement of the particles based on dipole-dipole electrostatic repulsion and an electrostatic force that is normal to the interface, thereby forming a monolayer of the particles on the flat interface with controlled lattice spacing;
   switching off the applied electric field;
   curing the UV curable resin with the electric field switched off so as to form a solidified resin film in the absence of an applied electric field, the monolayer of particles with lattice spacing embedded on a surface of the solidified resin film, and the lattice spacing of the particles not significantly changing as a result of said switching off before the resin film is solidified; and
   removing the second fluid from the solidified resin film.

2. The process of claim 1, wherein the second fluid is selected from air, silicone oil, or corn oil.

3. The process of claim 1, wherein the particles are deagglomerated from one another before said applying of the electric field.

4. The process of claim 1, wherein said curing of the UV curable resin is conducted by applying UV light.

5. The process of claim 1, wherein the lattice spacing of the particles corresponds to a defect-free lattice structure of the particles.

6. The process of claim 1, wherein said curing takes place in less than one second.

7. The process of claim 1, wherein said particles are in a size range of from about 100 nm to about 100 μm.

8. The process of claim 1, wherein the particles are formed of a material selected from the group consisting of glass, silica, polystyrene, steel, and salt crystals.

9. The process of claim 1, wherein the applied electric field is approximately uniform.

10. The process of claim 1, wherein the lattice spacing of the particles is controllable by adjusting intensity of the applied electric field.

11. A process for producing a film, the process comprising the steps of:
    placing particles in a flat interface between a first fluid and a second fluid, the first fluid being a UV curable resin;
    applying an ac or dc electric field in a direction normal to the flat interface to cause movement of the particles based on dipole-dipole electrostatic repulsion and an electrostatic force that is normal to the interface, thereby forming a monolayer of the particles on the flat interface with lattice spacing;
    switching off the applied electric field;
    curing the UV curable resin with the electric field switched off so as to form a solidified resin film in the absence an applied electric field, the monolayer of particles with lattice spacing embedded on a surface of the solidified resin film, and the lattice spacing of the particles not significantly changing as a result of said switching off before the resin film is solidified;
    removing the second fluid from the solidified resin film; and
    dissolving or removing the particles from the solidified resin film, whereby regular pores are created in the solidified resin film as a result of said dissolving or removing the particles from the solidified resin film.

12. The process of claim 11, wherein the second fluid is selected from air, silicone oil, or corn oil.

13. The process of claim 11, wherein the particles are deagglomerated from one another before said applying of the electric field.

14. The process of claim 11, wherein said curing of the UV curable resin is conducted by applying UV light.

15. The process of claim 11, wherein the lattice spacing of the particles corresponds to a defect-free lattice structure of the particles with long-range order.

16. The process of claim 11, wherein said curing takes place in less than one second.

17. The process of claim 11, wherein the particles are in a size range of from about 100 nm to about 100 μm.

18. The process of claim 11, wherein said particles are formed of a material selected from the group consisting of glass, silica, polystyrene, steel, and salt crystals.

19. The process of claim 11, wherein the applied electric field is approximately uniform.

20. The process of claim 11, wherein the lattice spacing of the particles is controllable by adjusting intensity of the applied electric field.

* * * * *